(12) United States Patent
Dunn et al.

(10) Patent No.: US 6,580,793 B1
(45) Date of Patent: Jun. 17, 2003

(54) METHOD AND APPARATUS FOR ECHO CANCELLATION WITH SELF-DEACTIVATION

(75) Inventors: James Patrick Dunn, Township of Northville, LaSalle County, IL (US); Peng Zhang, Buffalo Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/386,728

(22) Filed: Aug. 31, 1999

(51) Int. Cl.$^7$ .............................. H04M 9/08; H04M 3/00
(52) U.S. Cl. ............... 379/406.04; 379/406.01; 379/406.08; 370/352; 375/345
(58) Field of Search ............... 379/3, 406.01, 379/406.04, 406.05, 406.08, 406.11, 406.16; 375/345; 370/352

(56) References Cited

U.S. PATENT DOCUMENTS

| | | | | |
|---|---|---|---|---|
| 5,206,854 A | * | 4/1993 | Betts et al. | 372/32.1 |
| 5,307,405 A | * | 4/1994 | Sih | 379/410 |
| 5,511,064 A | * | 4/1996 | Oh et al. | 370/15 |
| 5,530,724 A | * | 6/1996 | Abrams et al. | 375/345 |
| 5,533,121 A | | 7/1996 | Suzuki et al. | 379/410 |
| 5,546,459 A | * | 8/1996 | Sih | 379/411 |
| 5,559,881 A | * | 9/1996 | Sih | 379/410 |
| 5,592,548 A | * | 1/1997 | Sih | 379/410 |
| 5,646,991 A | * | 7/1997 | Sih | 379/410 |
| 5,687,229 A | * | 11/1997 | Sih | 379/410 |
| 5,689,556 A | * | 11/1997 | Gupta et al. | 379/410 |
| 5,875,246 A | * | 2/1999 | Houghton | 379/406 |
| 6,052,462 A | * | 4/2000 | Lu | 379/410 |
| 6,212,273 B1 | * | 4/2001 | Hemkumar et al. | 379/410 |
| 6,282,176 B1 | * | 8/2001 | Hemkumar | 370/276 |
| 6,504,838 B1 | * | 1/2003 | Kwan | 370/352 |
| 6,507,653 B1 | * | 1/2003 | Romesburg | 379/406.05 |

FOREIGN PATENT DOCUMENTS

| | | | | |
|---|---|---|---|---|
| CA | 2316509 | * | 2/2001 | H04B/3/20 |
| EP | 1104116 A2 | * | 5/2001 | H04B/3/23 |
| GB | 2 245 459 A | | 2/1992 | |
| JP | 2001-94478 A | * | 4/2001 | H04B/3/23 |
| WO | WO 98/00960 | | 1/1998 | |

* cited by examiner

Primary Examiner—Binh Tieu

(57) ABSTRACT

An echo canceling system with self deactivation includes an echo canceller based on an adaptive filter, and an echo detector. The adaptive filter determines an estimate of an echo signal present in an untreated signal received from a "near" end of a communications channel. In order to produce an echo-canceled received signal, the echo canceller subtracts the estimated echo from the untreated received signal. The echo detector compares the energy of the untreated received signal and the energy of the echo-canceled received signal. The difference represents the energy in the estimated echo signal generated by the adaptive filter. If this energy is large, significant echo is present. The echo canceller remains activated, and the echo detector selects the echo-canceled received signal for output. If the estimated echo energy is small, little or no cancelable echo is present. The echo canceller is deactivated, and the echo detector selects the untreated received signal for output. Where plural channels of echo cancellation are provided, the deactivated echo canceller may be reallocated to service another communications channel.

11 Claims, 4 Drawing Sheets

METHOD AND APPARATUS FOR ECHO CANCELLATION WITH SELF-DEACTIVATION

FIELD OF THE INVENTION

This invention relates to telecommunications systems, and more particularly to echo cancellation systems used in transmission, switching, and other components of telecommunications systems, including packet-based and Internet voice networks.

BACKGROUND OF THE INVENTION

Echo remains a significant problem in voice and certain other telecommunications systems that incorporate physically lengthy transmission paths or other sources of significant transmission or propagation delay. Echo is typically caused when a signal generated by a "talker" and transmitted from a first end of a communications link is partially regenerated at a second end and returned to the first end of the link. By convention in the telecommunications arts, the end of the link containing the echo source—that is, the second end—is considered the "near" end of the link, and the talker is located at the "far" end of the link. The regenerated, or "echo" signal is received by the talker at the far end of the link, and can degrade the talker's perception of naturally generated speech from the near end. Echo may occur even when the communications link is formed from two isolated unidirectional communications paths operating in opposite directions, because devices at the ends of the link (or elsewhere) may receive a signal on one path, and transmit a regenerated by-product on the other path.

Depending on the amplitude and delay of the echo signal and its similarity to the original signal, the echo signal may be more or less noticeable to a user. When the by-product or "echo" signal has significant amplitude, and is delayed by more than about 20–30 mS, the echo signal may be sufficiently distracting as to make conversation difficult.

Echo may be produced in a number of ways. In conventional telecommunications transmission plants, a typical producer of echo has been the "hybrids" used as converters between four-wire transmission facilities and two-wire loops. Despite excellence in hybrid design, some leakage nonetheless occurs from the inbound path to the outbound path. When leakage occurs at a point "close" to the talker, the echo signal typically arrives with so little delay that it is neither noticeable or disturbing. However, when leakage occurs at the near end, such as at the near-end hybrid, the arrival of the echo signal at the far end may be significantly delayed due to the physical length of the transmission path and certain other network components. In that case, the echo signal may be noticeable; in some cases, the echo signal is so disturbing that conversation is difficult.

Several other network devices may also cause delay, even where physical path lengths are relatively short. For example, in modern mobile or wireless telephone systems and Internet voice systems incorporate voice coding devices (sometimes known as "vocoders"), which may introduce a significant delay. Even as telecommunications providers convert the world's telecommunications networks from analog to digital technologies, and despite the continual improvement in the performance of network components, some existing sources of echo remain, and new ones are created.

A variety of systems have been developed to minimize the effect of echo on the quality of communications service provided. When long-distance telecommunications systems were dominated by analog transmission facilities, the characteristics of individual transmission paths were carefully engineered to insert a controlled amount of attenuation. The attenuation was intended to reduce the amplitude of the echo signal such that it was not noticeable to the user. Although this system worked relatively well, it was primarily applicable to analog transmission facilities, and required significant continuing maintenance efforts and expense to adjust the attenuation levels to their engineered values.

Other systems have been developed to eliminate the effect of the echo signals without requiring careful control of the attenuation of transmission facilities. These systems are particularly necessary for digital telecommunications transmission systems, in which it is not feasible or desirable to introduce attenuation in the message content being carried by such transmission systems, but they have also been applied to analog transmission systems. These echo-control systems have incorporated two different main technologies which have been broadly characterized as "echo suppressers" and "echo cancellers."

Echo suppressers employ one or more speech detectors, and one or more switches in the audio paths of a telecommunications link. For example, in one known echo suppresser, a speech detector monitors the near-end receive path and responsively controls a switch that enabled the near-end transmit path. If speech is not detected (i.e., if the near end is not talking), the echo suppresser disables the transmit path, thus preventing the locally generated echo signal from being transmitted to the far end. Echo suppressers of this type work well provided only one party talks at a time, but work poorly when the parties interrupt one another or talk simultaneously, as is characteristic of normal conversation.

Improved echo suppressers have incorporated speech detectors on both transmit and receive paths, and enable the transmit audio path responsive to a comparison of speech levels on the respective paths. When both parties talk simultaneously, the suppresser may leave the transmit path enabled, resulting in no echo suppression during that period, or may attenuate the transmit path to an intermediate level. Echo suppressers have not provided entirely satisfactory results, in part because some echo remains detectable during periods of simultaneous speech, and because the frequent switching of audio paths results in numerous abrupt changes in speech amplitude which are noticeable to the users.

Echo cancellers construct a model of the round-trip signal path through the network (e.g., the path from the echo canceller to the leakage source at the near end, and back to the echo canceller) that results in the echo signal. Using the model, and based on the original signal transmitted from the far end to the near end, the echo canceller calculates an estimated echo signal which it expects to receive from the near end. The echo canceller then subtracts the estimated echo signal from the received near-end signal. If the model is good, the estimated echo signal closely approximates the actual echo component of the received signal, and the echo is effectively subtracted away or canceled. Thus, substantially only the signal originally transmitted by the near end remains.

Although effective echo cancellers are available, they are expensive. Historically, echo cancellers have been permanently installed to serve particular telecommunications facilities (e.g., trunks). However, echo control is not always required or desirable on a facility at all times or for all calls. For example, facilities may not be continuously in use. Also, some calls, such as those carrying certain types of data may be hindered by the action of echo cancellers. Some existing echo cancellers can detect that a served facility is carrying a data call of a type for which echo cancellation is not desired and may responsively disable cancellation.

Even for calls which do not carry data, conditions at the near end and/or over the communications path may be such that echo control is unnecessary. For example, the near-end leakage signal may be of small amplitude, attenuation along the communications path may be significant, the length of the path may be short, or another echo cancellation device may be present on the call. Any of these conditions could produce an echo signal which either is not noticeable to the user or does not disturb communication. Because a facility served by an echo canceller may be used in conjunction with various other facilities and intermediate and near-end equipment from call to call, echo control may be essential on some calls and superfluous on others.

However, it is believed that no known echo cancellers detect facility conditions or other characteristics of a call that render echo control unnecessary and respond accordingly to deactivate the echo canceller. This is the case even when another echo cancellation device may be present on a call or circuit. A protocol is available in which a signaling parameter alerts other switches that an echo cancellation device is already present on a call or circuit, allowing those switches to avoid activating their own echo canceller. However, in practice, the signaling parameters have not been properly implemented by all equipment vendors and some calls that should receive echo cancellation do not. Accordingly, service providers have been ignoring the signaling parameters and always attaching an echo cancellation device. If no echo is present, it is assumed that the echo cancellation device will not significantly affect the circuit or call to which it is attached. However, this is an inefficient use of expensive resources and where echo cancellers are managed as a group, increases the holding times of the entire group.

Conventional echo-cancellers are provided via dedicated wiring arrangements or through digital cross-connect systems that do not allow per-call configuration. In traditional long-distance networks, this has not been a penalty, since transmission circuits could be identified as long distance or local, and only the fraction of trunks (typically 40%) used for long distance need echo cancellers. However, wireless and Internet gateway trunks are not identified as long distance, and therefore, it is impossible to predict whether a particular trunk requires echo cancellers. In addition, there are no other commonly-stated qualities of a trunk on which to base a decision as to whether to provide echo cancellers. Therefore, service providers are deploying echo cancellers on a wide scale.

Furthermore, for Internet voice calls can be connectionless, which means that traditional circuit rules for echo canceller engineering do not work, and traditional physical wiring and cross-connect points do not exist. When echo cancellers are equipped on a switching fabric, they have the appearance of a resource pool. The engineering parameters needed by equipment vendors and service providers to correctly provision echo cancellers equipped as resource pools on a switching fabric have not yet been fully developed.

Moreover, although there have been attempts at per-call control of echo cancellers across long-distance networks, this has not been successful, and in some networks, echo cancellers have had to be deployed on all CLEC trunks. As these interfaces increase, the percentage of trunks needing echo cancellers is exploding. In wireless and Internet equipment, echo cancellers are being provided as service circuits equipped on the switching fabric to reduce the cost of expensive wiring and cross-connect equipment and to cope with the virtual nature of Internet facilities.

Also, conventional echo cancellers may be arranged as individual, self-contained units, or as a plurality of echo canceller channels provided by common equipment. Deactivating the echo canceller associated with a facility carrying a call idles an expensive resource. It is believe that in existing echo canceller systems, once an echo canceller is assigned to service a facility based on an expectation that the facility will need echo control, there is no provision to automatically reallocate the echo canceller to another facility when it is determined that the first facility will not significantly benefit from echo cancellation.

OBJECTS AND SUMMARY OF THE INVENTION

It is therefore an object of the present invention to provide an improved echo canceling system which minimizes the aforementioned disadvantages of the prior art.

An echo canceling system with self-deactivation constructed according to the present invention comprises an adaptive echo canceller for applying echo cancellation to a communications signal, an echo comparison system for comparing the echo-canceled signal produced by the echo canceller with the untreated communications signal, and a switch for selecting as an output signal either the echo-canceled signal or the untreated signal. The comparison may be based on the respective energies of the two signals over a recent interval.

When the echo comparison system determines that the difference between the echo-canceled signal and the untreated signal is large, significant echo is present in the untreated signal, and the echo-canceled signal is used.

When the difference between the echo-canceled signal and the untreated signal is small, either little echo is present in the untreated signal, or the echo canceller is ineffective in removing the echo present. In either case, the echo canceller is not significantly contributing to the quality of the communications circuit. Accordingly, the echo canceller is deactivated and the untreated signal selected for use. The echo canceller may remain idle, or, preferably may be allocated to another facility.

According to another aspect of the invention, an echo canceling system designed to service N facilities may incorporate fewer than N echo cancellers (or aggregate echo canceling capacity for fewer than N facilities) where not all facilities will simultaneously require echo cancellation. When a communications session (e.g., a call) is initiated on a facility served by the system, the system initially allocates an echo canceller to that facility. If the system determines that insignificant echo is present, the echo canceller is deactivated, and preferably made available for allocation to another facility when needed.

BRIEF DESCRIPTION OF THE DRAWINGS

These and other features of the invention will be best understood by reference to the following detailed description of a preferred embodiment of the invention, taken in conjunction with the accompanying drawings, in which.

DETAILED DESCRIPTION OF THE PREFERRED EMBODIMENTS

Figure 1:
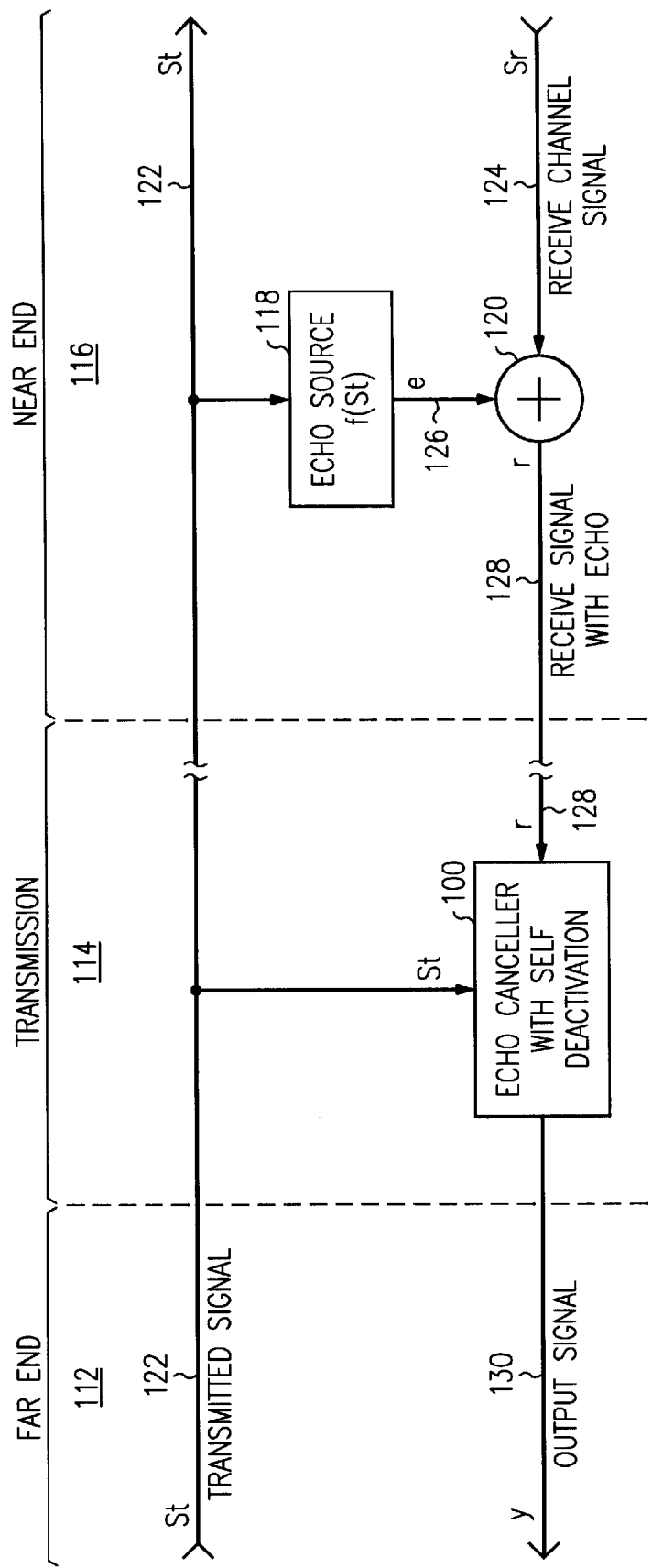
FIG. 1 is a block diagram of a communications circuit in which a preferred embodiment 100 of an echo canceling system with self-deactivation and constructed according to the present invention is applied to control echo.

FIG. 1 is a block diagram of a communications circuit 110 in which a preferred embodiment 100 of an echo canceling system with self-deactivation and constructed according to the present invention is applied to control echo. FIG. 1 depicts a model environment in which the echo canceling system 100 of the present invention may be used.

The present application relates to telecommunications systems, which may be implemented using a variety of electronic and optical technologies, including but not limited to: analog electronic systems; digital electronic systems; microprocessors and other processing elements; and software and other embodied collections of steps, instructions, and the like, for implementing methods, processes, or policies in conjunction with such systems and processing elements. The embodiments described herein are exemplary. Thus it will be appreciated that although the embodiments are described in terms of specific technologies, other equivalent technologies could be used to implement systems in keeping with the spirit of the present invention. Moreover, it will be appreciated that in the telecommunications arts, various signal leads, busses, data paths, data structures, channels, buffers, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures. Signal leads, and the like, are often referred to synonymously with the signals they carry, as is common in the telecommunications, electronics, and computer arts.

As best seen in FIG. 1, a typical communications circuit 110 includes a "far end" 112, a "near end" 116, and a transmission medium 114 connecting the two ends 112 and 116. Although real communications circuits may have impairments and echo sources in their transmission media, to maximize clarity in disclosing the present invention, the transmission medium 114 will be treated herein as benign, with the exception that it introduces a two-way propagation delay in the circuit.

A far-end communications device (not shown) is connected to the circuit 110 (it would appear to the left of the figure) and produces a transmitted signal $S_t$ (considered from the perspective of the far end) which is carried on lead 122 to the near end 116. A near-end communications device (not shown) is connected to the circuit 110 (it would appear to the right of the figure) and receives the transmitted signal $S_r$. The far-end and near-end communications devices could be any devices that require a circuit interconnection of the type shown, and may, for example, be the trunk interface circuits of first and second telephone switching systems. The near-end communications device produces a receive channel signal $S_r$, intended for the far-end communications device, on lead 124.

A source of echo 118 is present at the far end. The echo source 118 produces an echo signal e on lead 126 which is some function $f(S_t)$ of the far-end transmitted signal $S_t$ 122. The echo signal e is added to the receive channel signal $S_r$ by a summer 120 to produce a receive signal (designated r), polluted with the echo signal, on lead 128. This signal is conveyed by transmission medium 114 to the echo canceller 100. For clarity, echo source 118 and summer 120 are shown as distinct model elements; in practice, a plurality of circuit components may contribute to generation of the echo signal. A typical producer of an echo signal is a hybrid.

An echo canceling system 100 is located at the far end and receives the echo-polluted signal r 128 from the near end and the transmitted signal $S_t$ 122 from the far end. The echo canceling system 100 produces an output signal y 130 (discussed further in greater detail) which is either an echo-canceled version of the receive signal x, or the untreated received signal r, depending on a determination by the echo canceling system 100 of the amount of echo present in r.

Figure 2:
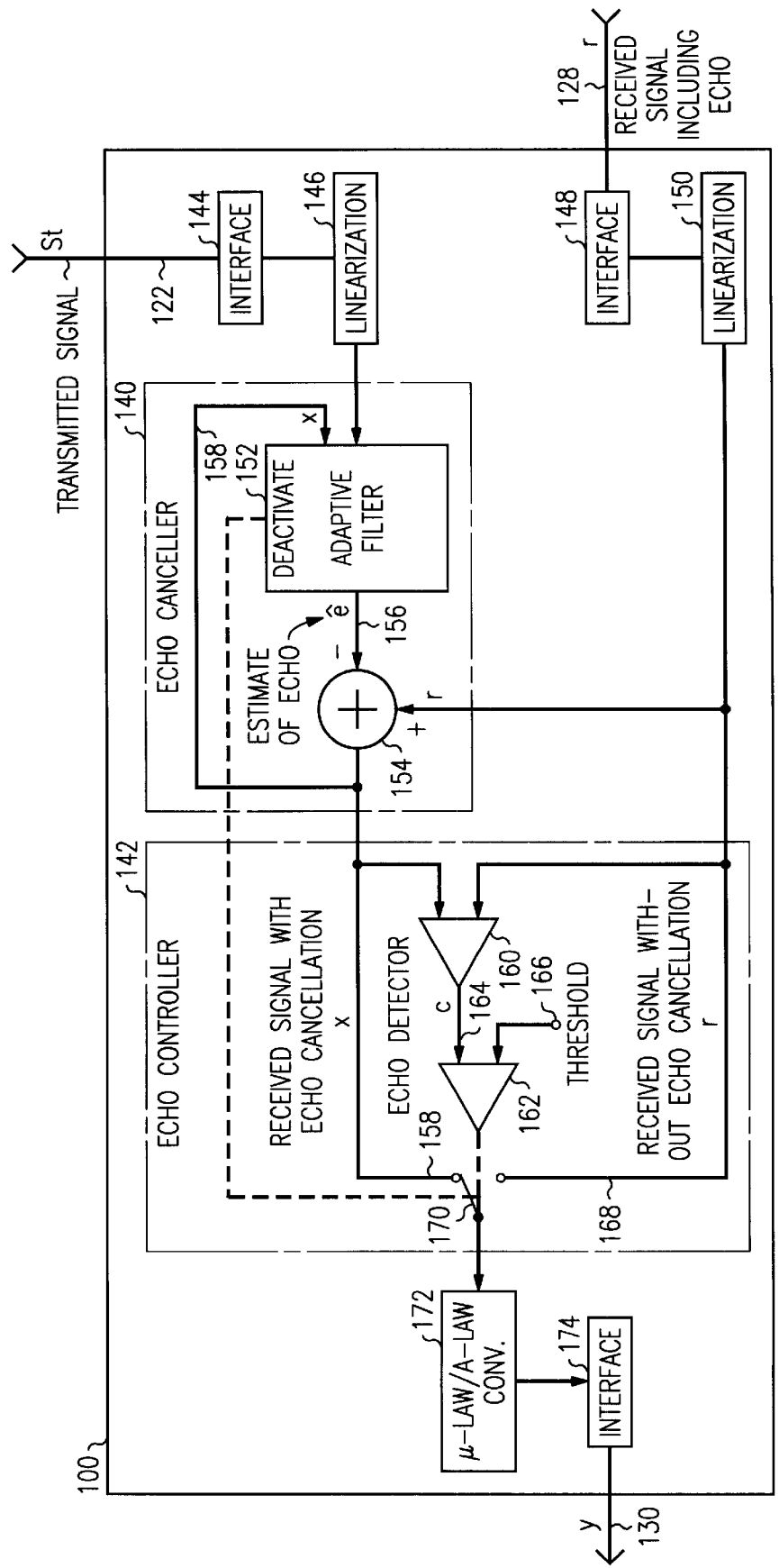
FIG. 2 is a block diagram of the echo canceling system 100 of FIG. 1.

FIG. 2 is a block diagram of a first preferred embodiment 100 of an echo canceling system constructed according to the present invention. As best seen in FIG. 2, the echo canceling system 100 provides echo cancellation for single communications circuit or channel. The echo canceling system 100 could be implemented, for example, as an integrated part of a personal-computer-based Internet telephone for packet voice calls. The invention is susceptible of many other implementations and applications, however.

Figure 4:
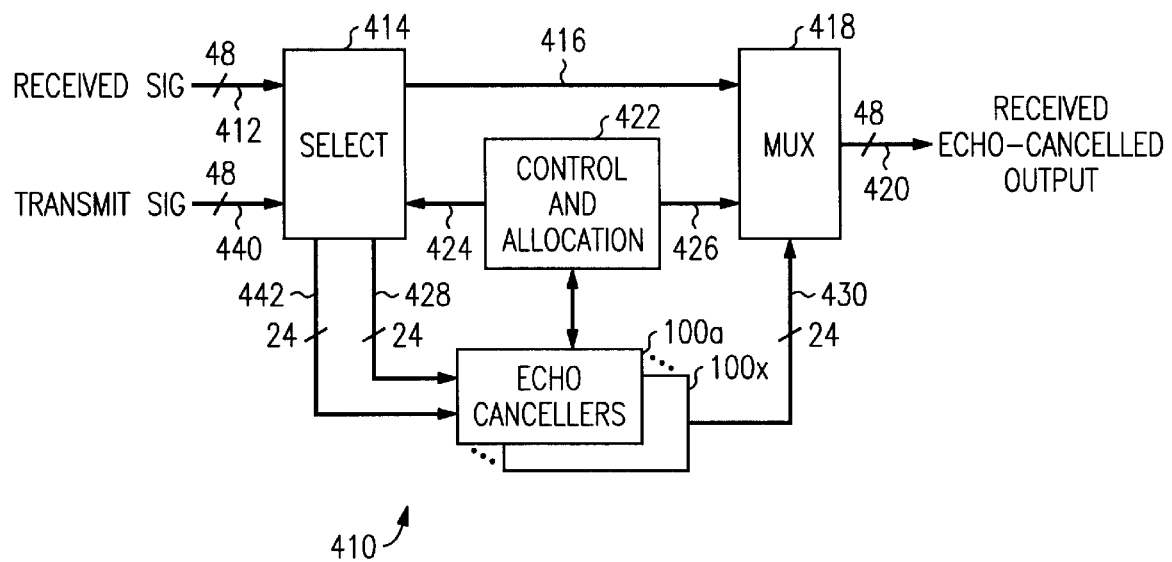
FIG. 4 is a block diagram showing a second preferred embodiment 410 constructed according to the present invention, in which a plurality of the echo cancellers 100 of FIG. 1 are arranged to form a pooled echo canceling system 410.

As discussed further in greater detail, FIG. 4 is a block diagram showing a second preferred embodiment 410 of an echo canceling system constructed according to the present invention, for providing echo cancellation service to multiple communications circuits or channels. A plurality of individual echo cancellation system channels 100 of the type shown in FIG. 1 may be used to assemble the multi-channel system 410 of FIG. 4.

As best seen in FIG. 2, echo canceling system 100 preferably comprises an adaptive echo canceller 140, an echo comparison and control device (echo controller) 142, and components for interfacing with external communications circuit signals and converting the signals among external formats and an internal format. The echo canceling system 100 receives the far-end transmitted signal $S_t$ 122, and the near end echo-polluted received signal r 128, and produces an output signal y 130, for use by the far-end communications device. The far-end transmitted signal $S_t$ 122 is supplied to an interface circuit 144 which adapts the signal so it is suitable for internal use. The adapted signal is provided to linearization module 146, which may be required to convert PCM signals with A-law or $\mu$-law encoding into linear samples. The resulting signal is provided to echo canceller 140. The echo-polluted near-end receive signal r 128 is similarly adapted and linearized by units 148 and 150.

The exact functions of interface circuits 144 and 148 depend on the type and format of the communications circuit 110 and the technology chosen to implement the echo canceling system 100. A variety of types and formats are available for communications circuits, including analog lines and trunks, ISDN lines, T-carrier facilities, and the like. Echo canceling system 100 may be implemented using special purpose dedicated electronic systems, general purpose microprocessors, digital signal processors, or various combinations of these. The conversion of an external communications circuit signal to one suitable for processing in the echo canceling system 100, and vice versa, is known to those of skill in the art; typically, an analog or serial digital format must be converted to parallel data samples for efficient signal processing by conventional or DSP processors, and vice versa.

As best seen in FIG. 2, echo canceller 140 preferably includes an adaptive filter 152 and a summer 154. The adaptive filter 152 receives the linearized version of the $S_t$ far-end transmitted signal and an echo-canceled receive signal x, and produces a signal ê 156 which represents an estimate by the adaptive filter of the echo signal present in the echo-polluted received signal r. The estimated echo signal ê 156 is subtracted from the echo-polluted received signal r in summer 154 to produce the echo-canceled received signal x 158, which is supplied to the adaptive filter 152 and to the echo controller 142. If the estimated echo signal ê is close to the real echo signal e 126 (FIG. 1), the echo-canceled received signal x 158 will have little remaining echo. Echo canceller 140 and its adaptive filter 152 may be implemented using any suitable echo canceling and adaptive filtering components. The design of these elements is well known to those of skill in the telecommunications arts.

Echo controller 142 receives the echo-polluted (i.e., untreated) near-end received signal r 128, and the echo-canceled received signal x 158. The function of the echo controller 142 is to compare these two signals to determine whether significant echo present in r has been removed in x. If the difference between these signals is large, then echo is present, and the echo canceller 140 is effectively removing it. Accordingly, the echo controller 142 selects the echo-canceled received signal x for output. If the difference between these signals is small, then the echo canceller 140 is providing little significant benefit. Accordingly, the echo controller 142 selects the untreated received signal r for output, and echo canceller 140 may be deactivated.

Echo detector 160 performs the comparison of the two signals by first measuring the energy of the signals over a recent sampling period. The energy Er of the untreated received signal r is determined as $$Er(t) = \sum_{i=0}^{M-1} r^2_{(t-i)},$$

where M is a number of samples in a sampling window, and t represents the current or most recently processed samples. The energy Ex of the echo-canceled received signal x is determined as $$Ex(t) = \sum_{i=0}^{M-1} x^2_{(t-i)}.$$

Echo detector 160 then subtracts Ex from Er to form ΔE 164.

A second comparator 162 compares the ΔE result with a threshold value 166. In practice, a small amount of echo is not bothersome. Accordingly, it is desirable to employ a threshold to allow the system operator to select a level of echo below which echo cancellation will not be provided. If the ΔE difference is greater than the threshold, echo cancellation must be provided. The threshold also allows the system operator to adjust for any residual echo that cannot be removed by the echo cancellation device in normal operation. The output of comparator 162 controls a switch 170, which responsively selects one of echo-canceled received signal x or the untreated received signal r for output. The output signal is provided to an optional converter 172, which converts linear samples to μ-law or A-law PCM, and then to an interface unit 174, which provides the inverse of the functions of units 144 and 148. The output signal y of the echo canceling system 100 is provided on lead 130.

Advantageously, when the echo canceller 100 is deactivated, some of its resources may be used elsewhere in a system. For example, echo canceller could be implemented as part of an Internet telephone application on a personal computer or workstation. In that case, the echo canceller could be implemented entirely as appropriate software running in the personal computer or workstation. However, the signal processing required for the echo canceller is resource intensive. By deactivating the echo canceller, the processor time and memory which would be required to perform the echo canceller functions may be reallocated to other functions on the computer.

FIG. 4 is a block diagram of a second preferred embodiment 410 of an echo canceling system constructed according to the present invention. As best seen in FIG. 4, a plurality of echo canceling systems 100 of the type shown in FIGS. 1–2 may be assembled to form a pooled, multi-channel echo canceling system 410. System 410 preferably comprises an input interface and selector 414, an output interface and multiplexor 418, a plurality of echo canceller units or modules 100a–100x, and a control and allocation unit 422. The terms "echo canceller unit" and "echo canceller module" are intended to refer to an echo canceller system 100 substantially as shown in FIG. 2, and including at least the echo canceller 140 and the echo controller 142 thereof. System 410 receives a plurality of input signals via leads 412 and 440, which may be, for example, groups of DS-1 carrier facilities. The signals on lead 412 correspond to signals received from the near end of a communications link and are equivalent to signal r 128 of FIG. 1. The signals on lead 440 correspond to respective signals transmitted from the far end of a communications link and are equivalent to signal $S_t$ 122 of FIG. 1.

Advantageously, system 410 may be designed to accept N facilities or communications channels, while simultaneously providing echo cancellation services to some smaller number of those channels. As best seen in FIG. 4, for example, system 410 may be equipped to receive groups of DS-1 carrier facilities 412 and 440, which may carry the equivalent of both directions of 48 voice-grade DS-0 circuits. However system 410 may be equipped with only 24 echo canceller channels 100a–100x. These numbers are provided for example only; the actual number of echo canceller channels required to support a number of communications channels or facilities will depend on the particular application. A control and allocation unit 422 supervises the operation of system 410, and allocates echo canceller channels to communications channels or facilities as needed.

The groups of DS-1 inputs 412, 440 are provided to a selector 414 which operates under the supervision of the control and allocation unit 422. The selector 414 selects paired respective channels from each group of DS-1 inputs 412, 440, to receive echo cancellation services from allocated ones of echo canceller channels 100a–100x. The selector 414 may also perform format conversion from serial time slots to parallel samples, or other appropriate conversions. The selected channels are routed to echo canceller channels 100a–100x over internal busses 428 and 442. When a communications channel on DS-1 inputs 412, 440 is allocated service from an echo canceller channel, the receive path from input 412 is routed to the allocated echo canceller channel via bus 428, and the transmit path from input 440 is routed to the same echo canceller channel via bus 442.

Input channels which are not allocated an echo canceller channel are passed directly to output interface and multiplexor 418 over internal bus 416. The outputs from the echo cancellers 100a–100z are transmitted to output multiplexor 418 via internal bus 420. The control and allocation unit 422 controls output multiplexor 418 to supply each output timeslot with the corresponding channel from the echo cancellers or the input selector, according to whether the channel was allocated an echo canceller.

In operation, when a previously idle input channel commences operation, the control and allocation unit 422 allocates an available echo canceller, if there are any, to service the channel. The allocated echo canceller begins operation. If the echo canceller determines that echo is small, it deactivates itself and notifies the control and allocation unit 422. The control and allocation unit 422 may then instruct input selector and output multiplexors to establish a direct path for the channel over bus 416. Thereafter, the control and allocation 422 may reassign that echo canceller to another channel requiring service.

Although echo canceller system 410 is described herein in terms of the technology of circuit-switched networks, one of skill in the art will appreciate how system 410 may be modified without departing from the spirit of the present invention to interface with and employ internally packet switched network technology. In particular, in a non-circuit-switched network, input leads 412 and 440, and output lead 420 may be implemented using any transport medium, including ATM or TCP/IP links. Selector 414 and multiplexor 418 may be implemented as any suitable packet or cell router or switch. Further, the functions of both selector 414 and multiplexor 418 may be performed by one integrated unit.

Moreover, whether in a circuit-based or non-circuit-based application, although echo cancellers are described herein as individual channels, one of skill in the art will appreciate that the equivalent functionality of a plurality of individual echo canceller channels may be provided by one or a few common elements. These common elements may, for example, be implemented as one or more high-performance DSP-based modules, which receive highly multiplexed inputs and produce highly-multiplexed outputs, and in which no equipment is associated with a particular communications channel, circuit, path, or call.

Further, although echo canceling system 410 is described herein as a standalone device, the echo canceling system 410 could also be implemented as a portion of a telecommunications switching system, or other routing or switching infrastructure. For example, some telecommunications switching systems, such as the 5ESS® Electronic Switching System of Lucent Technologies, Inc., Murray Hill, N.J., have a high-capacity Time Slot Interchange (TSI) bus which provides relatively high-bandwidth access to a large number of time slots, channels, or equivalent. Echo canceling units 100a–100z could advantageously interface to this TSI bus. Since the signals are already available in the regular time slots of the switching system, and the switching system can control which signals are inserted in which time slots, the need for selector 414 and multiplexor 418 would be eliminated.

A suitable arrangement for incorporating a signal processing facility on the TSI bus of an electronic switching system is disclosed in Bodnar, et al. U.S. patent application Ser. No. 09/092,666, entitled, "Switching Internet Traffic Through Digital Switches Having a Time Slot Interchange Network," which is hereby incorporated by reference. Although the Bodnar application is not directed to echo cancellation, the application shows two embodiments in which similar signal processing equipment (Modem Signal Processor 201, FIG. 2; and Vocoder Signal Processor 301, FIG. 3) is connected to the TSI bus of a switch. An echo canceller system as contemplated in the present application could be similarly connected.

Figure 3:
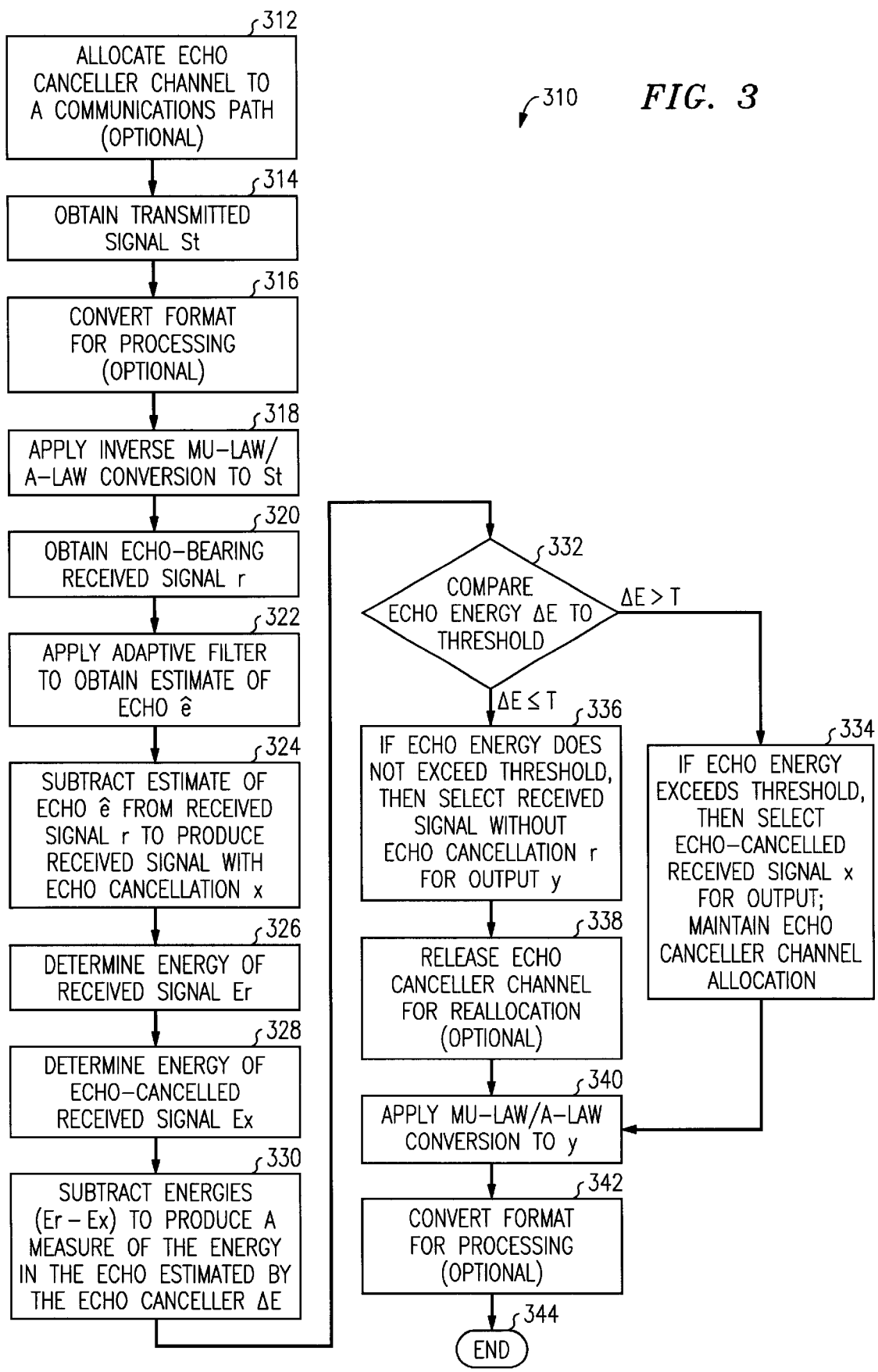
FIG. 3 is a flow diagram showing a method of operation for use in conjunction with the echo canceling systems 100, 410 of FIG. 1 and 4.

FIG. 3 is a flow diagram showing a method of operation 310 arranged in accord with the present invention for use with echo canceling systems 100, 410 of FIGS. 1 and 4. Most elements of the method 310 are appropriate for both embodiments 100 and 410, and therefore the method as applied to both will be described jointly, noting the differences between embodiments where appropriate. The method starts when a previously idle channel which is eligible to receive echo cancellation service, becomes busy. In step 312 (optional, for embodiment 410, only) an echo canceller channel is allocated to a communications path, channel, or facility. In step 314, the echo canceller system obtains the far-end transmitted signal $S_t$. In step 316, which is optional, depending on the respective formats and protocols of the communications channel and the echo canceller system, the echo canceller system converts the input signal into an appropriate internal format. In step 318, which may also be optional, the echo canceller system converts $\mu$-law- or A-law-encoded PCM data to linear samples.

In step 320, the echo canceller system obtains the untreated signal r received from the near end. This signal may contain echo. Optionally, steps 316 and 318 may be applied to r. In step 322, the adaptive filter component 152 (FIG. 2) determines an estimate ê of the echo signal. In step 324, the summer component 154 subtracts the echo estimate ê from the untreated received signal r. The result is an echo-canceled received signal x.

In step 326, the echo detector 160 determines the energy Er of the untreated received signal. In step 328, the echo detector 160 determines the energy Ex of the echo-canceled received signal. In step 330, the echo detector 160 subtracts the energy Ex from Er to produce a measure ΔE of the energy in the estimated echo signal generated by the echo canceller.

In step 332, comparator 162 compares the ΔE measure with a threshold. If the energy in the echo signal exceeds the threshold, then the method continues in step 334. The comparator selects the echo-canceled received signal x to be the output signal y. The echo canceller remains active. In multi-channel echo canceller embodiments where an echo canceller may be allocated to a channel, that allocation is maintained. The method then continues at step 340.

If, in step 332, the energy in the echo signal did not exceed the threshold, then the method continues in step 336. The comparator 162 selects the untreated received signal r to be the output signal y. The echo canceller is deactivated. In step 338, which is optional, the echo canceller is released for reallocation to another channel. The method continues at step 340.

In step 340, which may be optional, the echo canceller system converts linear samples to $\mu$-law- or A-law-encoded PCM data. In step 342, which may also be optional, depending on the respective formats and protocols of the communications channel and the echo canceller system, the echo canceller system converts the output signal from the internal format to one appropriate for the external communications channels with which the echo canceller is used. The method ends at step 344.

According to a further aspect of the present invention, information obtained about the quantity of echo experienced by a trunk, facility, or call, whether physical or virtual, may be recorded for administrative purposes. For trunk facilities, a cumulative holding time may be determined from the stored data, and may be used to engineer the quantity of echo cancellers required in an echo canceller pool, as is known in the art. For Internet and other connectionless services, the fraction of calls requiring echo cancellation may be determined from the stored data. This acquired data, which has not heretofore been available, may now be studied to develop procedures for provisioning echo cancellers.

Moreover, the same stored data may be analyzed to direct maintenance functions, and can be used in real-time to remove bad circuits when quality degrades.

The above-described embodiment of the invention is merely one example of a way in which the invention may be carried out. Other ways may also be possible and are within the scope of the following claims defining the invention.

What is claimed is:

1. A self deactivating echo canceling system for selectably providing echo cancellation of an untreated received signal comprising:

an echo canceller responsive to said untreated received signal to produce an echo-canceled received signal;

an echo controller coupled to said echo canceller, said echo controller being responsive to said untreated received signal and said echo-canceled received signal to produce a measure of an estimated echo signal;

said echo controller being further responsive to said measure of said estimated echo signal and a predetermined threshold to present as an output of said echo canceling system said untreated received signal when said measure of an estimated echo signal does not exceed said threshold.

2. The echo canceling system of claim 1 wherein said echo controller presents as an output of said echo canceling system said echo-canceled received signal when said measure of an estimated echo signal exceeds said threshold.

3. The echo canceling system of claim 1 wherein said echo controller determines said measure of an estimated echo signal by determining a difference of energy of said untreated received signal from energy of said echo-canceled received signal.

4. The echo canceling system of claim 1, said echo controller being responsive to said measure of said estimated echo signal and a predetermined threshold to deactivate said echo canceller when said measure of an estimated echo signal does not exceed said threshold.

5. A self deactivating echo canceling system for selectably providing echo cancellation of a plurality of untreated received signals comprising:

means for receiving a plurality of untreated received signals;

a plurality of echo canceling units coupled to the receiving means;

a control coupled to said receiving means and said echo canceling units, said control allocating to selected ones of said plurality of untreated received signals corresponding ones of said plurality of echo canceling units;

each of said echo canceling units producing a measure of an estimated error signal;

each of said echo canceling units being responsive to said measure of said estimated echo signal and a predetermined threshold to present as an output of such echo canceling unit said corresponding untreated received signal when said measure of an estimated echo signal does not exceed said threshold.

6. The echo canceling system of claim 5 wherein said echo canceling unit is responsive to said corresponding untreated received signal to produce a corresponding echo-canceled received signal, and presents as an output of said echo canceling system said corresponding echo-canceled received signal when said measure of an estimated echo signal exceeds said threshold.

7. The echo canceling system of claim 5 wherein said echo canceling unit is responsive to said corresponding untreated received signal to produce a corresponding echo-canceled received signal, and said echo canceling unit determines said measure of an estimated echo signal by determining a difference of energy of said corresponding untreated received signal from energy of said corresponding echo-canceled received signal.

8. The echo canceling system of claim 5, said echo canceling unit being responsive to said measure of said estimated echo signal and a predetermined threshold to deactivate said echo canceling unit when said measure of an estimated echo signal does not exceed said threshold.

9. The echo canceling system of claim 5, said control being responsive to said measure of said estimated echo signal and a predetermined threshold to reallocate any echo canceling unit currently allocated to said corresponding untreated received signal to a different one of said plurality of untreated received signals.

10. A method for selectively canceling echo in a communications channel comprising the steps of:

receiving an untreated signal from said communications channel;

determining a measure of an estimated echo signal present in said untreated receive signal;

comparing said measure of an estimated echo signal present in said untreated receive signal with a threshold; and if said estimated echo signal present in said untreated receive signal does not exceed said threshold, presenting as an output said untreated receive signal.

11. The method of claim 10 further comprising the steps of:

responsive to said untreated receive signal, determining an adaptively-echo-canceled receive signal; and if said estimated echo signal present in said untreated receive signal exceeds said threshold, presenting as an output said adaptively-echo-canceled receive signal.

* * * * *